US006934778B2

(12) United States Patent  
Numano (10) Patent No.: US 6,934,778 B2  
(45) Date of Patent: Aug. 23, 2005

(54) INFORMATION PROCESSING APPARATUS AND INPUT ASSISTING METHOD FOR USE IN THE SAME

(75) Inventor: Fujihito Numano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 46 days.

(21) Appl. No.: 10/439,013

(22) Filed: May 16, 2003

(65) Prior Publication Data

US 2004/0001098 A1 Jan. 1, 2004

(30) Foreign Application Priority Data

Jun. 28, 2002 (JP) ........................................ 2002-189942

(51) Int. Cl.[7] ................................................ G06F 3/14
(52) U.S. Cl. ......................................... 710/67; 345/172
(58) Field of Search ........................... 710/67; 345/156, 345/168, 172; 341/26

(56) References Cited

U.S. PATENT DOCUMENTS 5,973,688 A * 10/1999 May ............................ 715/709
6,104,872 A * 8/2000 Kubota et al. ............... 717/110
6,532,499 B1 * 3/2003 Nakamura .................... 710/1
2002/0101406 A1 * 8/2002 Tseng .......................... 345/173

FOREIGN PATENT DOCUMENTS

JP 5-119893 5/1993

OTHER PUBLICATIONS

Kayama, Masashi, "Closeup of Online Software Best Selected by Power Report", DOS/V Power Report, Japan, Impress Corporation, May 1, 1998, vol. 8, No. 5, p. 350.
Notification of Reasons for Rejection Issued by Japanese Patent Office on Jan. 4, 2005, in Japanese Application No. 2002–189942 and English language translation of Notification.

* cited by examiner

*Primary Examiner*—Kim Huynh
(74) *Attorney, Agent, or Firm*—Finnegan, Henderson, Farabow, Garrett & Dunner, L.L.P.

(57) ABSTRACT

An information processing apparatus is capable of executing functions associated with a plurality of shortcut keys each comprising a combination of an auxiliary key and another key. The apparatus includes a key-input device including a plurality of keys, a unit that detects depression of an auxiliary key of the key-input device, and a unit that displays, on a display screen, a list of shortcut keys including the auxiliary key detected.

11 Claims, 9 Drawing Sheets

EDIT SCREEN

| SHORTCUT KEY | FUNCTION |
|---|---|
| Ctrl+K | INSERT HYPERLINK |
| Ctrl+J | ////////// ← INPUT FUNCTION NAME |
| ⋮ | ⋮ |
| Ctrl+; | INPUT PRESENT DATE |
|  |  |
| ⋮ | ⋮ |
|  |  |
|  |  |
| ⋮ | ⋮ |
|  |  |

APL#1: rows Ctrl+K through Ctrl+;
APL#2: next block
COMMON TO SYSTEM: last block

FIG. 9

DISPLAY PROPERTY SCREEN  303

| DISPLAY | SHORTCUT KEYS | FUNCTION NAMES |
|---|---|---|
| ☑ | Ctrl+K | INSERT HYPERLINK |
| ☑ | Ctrl+; | INSERT PRESENT DATE |
| ☐ | Ctrl+Z | RESTORE EXECUTION RESULT OF IMMEDIATELY PREVIOUS OPERATION |
| ☑ | XXXX | XXXXXXXX |
| ☑ | XXXX | XXXXXXXX |

FIG. 10

```
         ┌─────────────────────┐
         │ LIST DISPLAY PROCESS│
         └──────────┬──────────┘
                    │ S121
    ┌───────────────▼────────────────┐
    │ RETRIEVE FROM SHORTCUT KEY LIST│
    │ TABLE SHORTCUT KEY INFORMATION │
    │ OF SHORTCUT KEYS USING KEY     │
    │ DEPRESSED FOR 5 SECONDS OR MORE│
    └───────────────┬────────────────┘
                    │ S122
    ┌───────────────▼────────────────┐
    │ EXTRACT SHORTCUT KEYS FOR WHICH│
    │    "DISPLAY" IS SELECTED       │
    └───────────────┬────────────────┘
                    │ S123
    ┌───────────────▼────────────────┐
    │  DISPLAY SHORTCUT KEY LIST WINDOW│
    └────────────────────────────────┘
```

FIG. 11

RETRIEVAL RESULT SCREEN

| APL1 | |
|---|---|
| Ctrl+Enter | INPUT SAME VALUE AS ACTIVE CELL IN SELECTED CELL RANGE |
| Ctrl+Y | REPEAT IMMEDIATELY PREVIOUS OPERATION |
| Ctrl+D | COPY TO DOWNWARD CELL IN SELECTED RANGE |
| Ctrl+R | COPY TO RIGHT-HAND CELL IN SELECTED RANGE |
| Ctrl+F3 | DEFINE NAME |
| Ctrl+K | INSERT HYPERLINK |
| Ctrl+ ; | INPUT PRESENT DATE |
| Ctrl+Z | RESTORE EXECUTION RESULT OF IMMEDIATELY PREVIOUS OPERATION |
| ⋮ | ⋮ |
| COMMON TO SYSTEM | |
| Ctrl+C | COPY |
| Ctrl+V | PASTE |
| ⋮ | ⋮ |

INFORMATION PROCESSING APPARATUS AND INPUT ASSISTING METHOD FOR USE IN THE SAME

CROSS-REFERENCE TO RELATED APPLICATIONS

This application is based upon and claims the benefit of priority from the prior Japanese Patent Application No. 2002-189942, filed Jun. 28, 2002, the entire contents of which are incorporated herein by reference.

BACKGROUND OF THE INVENTION

1. Field of the Invention

The present invention relates generally to an information processing apparatus, such as a personal computer, and an input assisting method for use in the information processing apparatus. This invention relates more particularly to an information processing apparatus that can execute functions associated with a plurality of shortcut keys and an input assisting method for use in the information processing apparatus.

2. Description of the Related Art

In general, an information processing apparatus such as a personal computer can make use of a shortcut key. The shortcut key is a combination of keys used to perform a defined function. Each of shortcut keys is expressed by a combination of an auxiliary key and another key such as an alphabet key. The auxiliary key is a key such as a [Ctrl] key, an [Alt] key or a [Shift] key, or a combination thereof.

The use of the shortcut key enables the user to immediately designate execution of a desired function, without the need to perform such operations as using a mouse to open a menu and selecting a command on the menu.

The user, however, has to memorize key combinations of shortcut keys associated with respective functions, in order to designate execution of desired functions.

In general, many shortcut keys are defined in personal computers. It is difficult for the user to memorize key combinations of all shortcut keys.

Furthermore, usable shortcut keys vary depending on an application program that is running at the time. The user is thus required to memorize key combinations of shortcut keys for each application program.

BRIEF SUMMARY OF THE INVENTION

According to an embodiment of the present invention, there is provided an information processing apparatus for executing functions associated with a plurality of shortcut keys each comprising a combination of an auxiliary key and another key, the apparatus comprising: a key-input device including a plurality of keys; means for detecting depression of an auxiliary key of the key-input device; and means for displaying, on a display screen, a list of shortcut keys including the auxiliary key detected.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
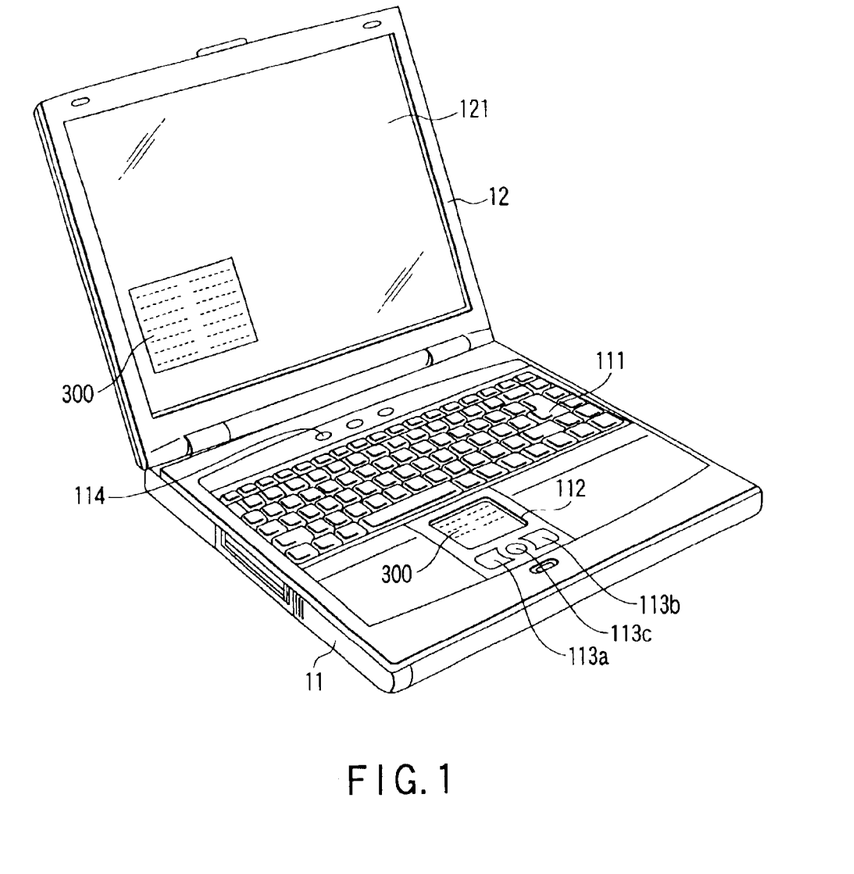
FIG. 1 shows an external appearance of a computer according to an embodiment of the present invention, in a state in which a display of the computer is opened.
Figure 2:
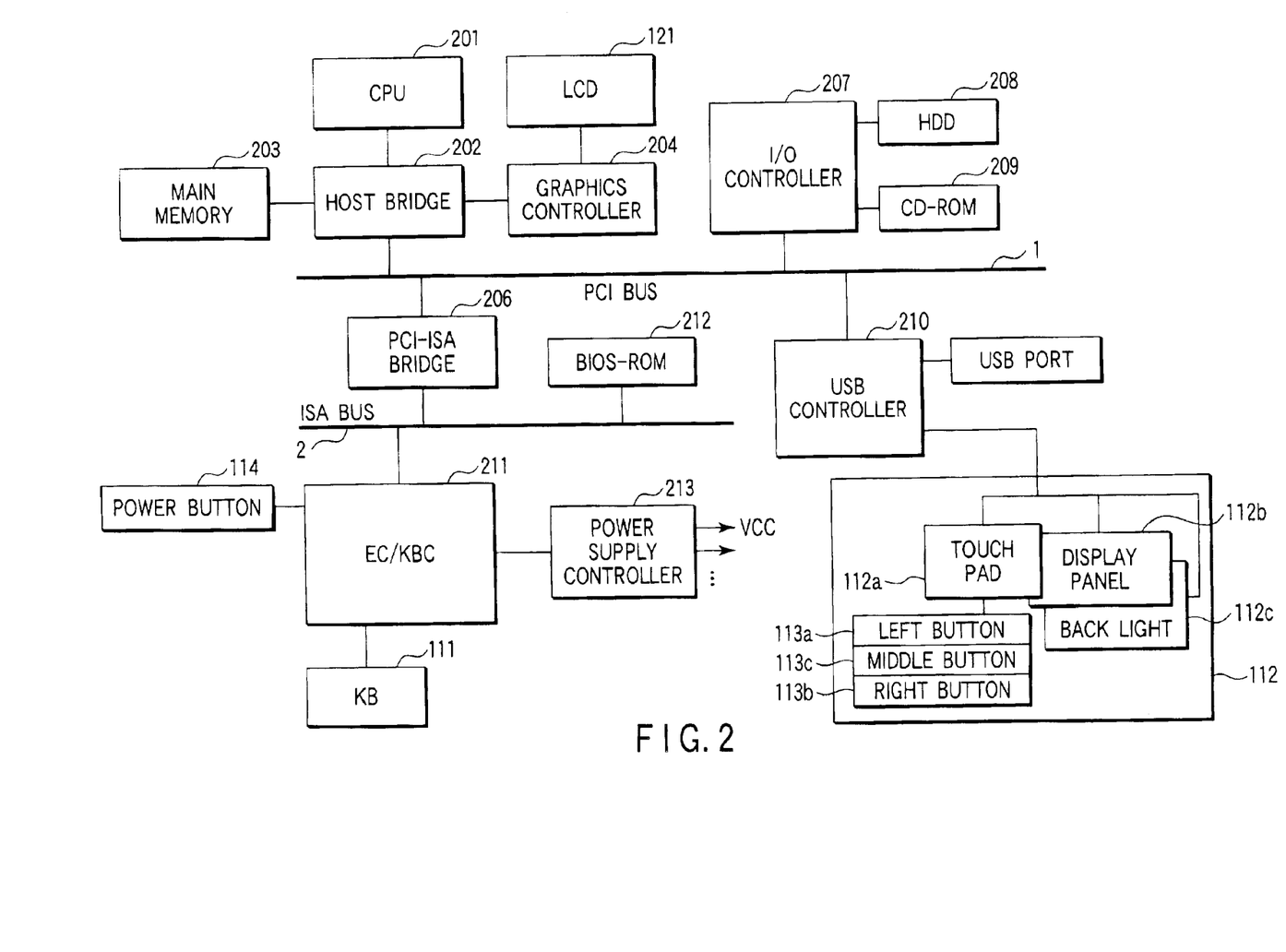
FIG. 2 is a block diagram showing a system configuration of the computer according to the embodiment.

Embodiments of the present invention will now be described with reference to the accompanying drawings. Referring to FIGS. 1 and 2, the structure of an information processing apparatus according to an embodiment of the invention will first be described. The information processing apparatus is realized as a notebook type personal computer.

FIG. 1 shows the front side of the computer, with its display unit opened. The computer comprises a computer main body 11 and a display unit 12. The display unit 12 incorporates a display panel comprising an LCD (Liquid Crystal Display) 121. The LCD 121 is located on a central area of the display unit 12.

Windows associated with application programs are displayed on a display screen of the LCD 121. In addition, in this computer, the display screen of LCD 121 can display a shortcut key list window 300 that assists a user's shortcut key input operations. The shortcut key list window 300 shows a list of usable shortcut keys of the computer.

The display unit 12 is attached to the computer main body 11 such that it can rotate between an open position and a closed position. The computer main body 11 has a thin box-shaped housing. A keyboard 111, a tablet-type pointing device 112, a left button 113*a*, a right button 113*b* and a middle button 113*c* are disposed on a top surface of the main body 11. The keyboard 111 is a key-input device having a set of keys, and is used to input a key code associated with a depressed key to the computer.

The tablet-type pointing device 112 comprises a display panel (sub-display) of an LCD, etc. and a transparent tablet disposed on the sub-display. The pointing device 112 functions not only as a pointing device for moving a mouse cursor, but also as a touch screen.

The display screen of the sub-display of pointing device 112 can display various kinds of information. In this computer, the aforementioned shortcut key list window 300 can be displayed on the display screen of the sub-display of pointing device 112. The user can designate the LCD 121 (main display) or the sub-display of pointing device 112, which should display the shortcut key list window 300. If the shortcut key list window 300 is displayed on the sub-display, it is possible to present the shortcut key list window 300 to the user, without the shortcut key list window 300 covering a part or all of an active window on the main display.

A power button 114 for powering on/off the computer is provided on a rear part of the top surface of the computer main body 11.

FIG. 2 shows the system configuration of the computer.

The computer, as shown in FIG. 2, comprises a CPU 201, a host bridge 202, a main memory 203, a graphics controller 204, a PCI-ISA bridge 206, an I/O controller 207, a hard disk drive (HDD) 208, a CD-ROM drive 209, a USB (Universal Serial Bus) controller 210, an embedded controller/keyboard controller IC (EC/KBC) 211, a BIOS-ROM 212, and a power supply controller 213.

The CPU 201 is a processor provided to control the operation of the computer. The CPU 201 executes an operating system (OS) and an application program/utility program, which are loaded in the main memory 203 from the hard disk drive (HDD) 208. The CPU 201 also executes a BIOS (Basic Input/Output System) stored in the BIOS-ROM 212 and a control program. The control program comprising a dedicated utility program executes display of the shortcut key list window 300.

The host bridge 202 is a bridge device for bi-directionally connecting a local bus of CPU 201 and a PCI bus 1. The graphics controller 204 controls the LCD 121 used as a display monitor of the computer. The I/O controller 207 is one of PCI (Peripheral Component Interconnect) devices. The I/O controller 207 includes an IDE (Integrated Drive Electronics) controller for controlling the hard disk drive (HDD) 208 and CD-ROM drive 209.

The PCI-ISA bridge 206 is a bridge device for bi-directionally connecting the PCI bus 1 and an ISA (Industry Standard Architecture) bus 2. In this embodiment, the PCI-ISA bridge 206 includes various system devices such as a system timer, a DMA controller and an interrupt controller.

The USB controller 210 is a PCI device. In this embodiment, the aforementioned tablet-type pointing device 112 is connected to the USB controller 210. The tablet-type pointing device 112 comprises a touch pad 112a, a display panel 112b, a back light 112c, a left button 113a, a right button 113b and a middle button 113c. The touch panel 12a and display panel 112b are integrated as one piece. The touch pad 112a comprises a transparent coordinate detection device disposed on a display surface of the display panel 112b that comprises an LCD. The display panel 112b functions as a sub-display of the computer.

The embedded controller/keyboard controller IC (EC/KBC) 211 is a one-chip microcomputer wherein an embedded controller for power management and a keyboard controller for controlling the keyboard 111 are integrated. The embedded controller/keyboard controller IC (EC/KBC) 211 has a function of cooperating with the power supply controller 213 and powering on/off the computer in accordance with the user's operation of the power button 114.

A BIOS is stored in the BIOS-ROM 212. The BIOS is a program for controlling hardware components in the system.

Figure 3:
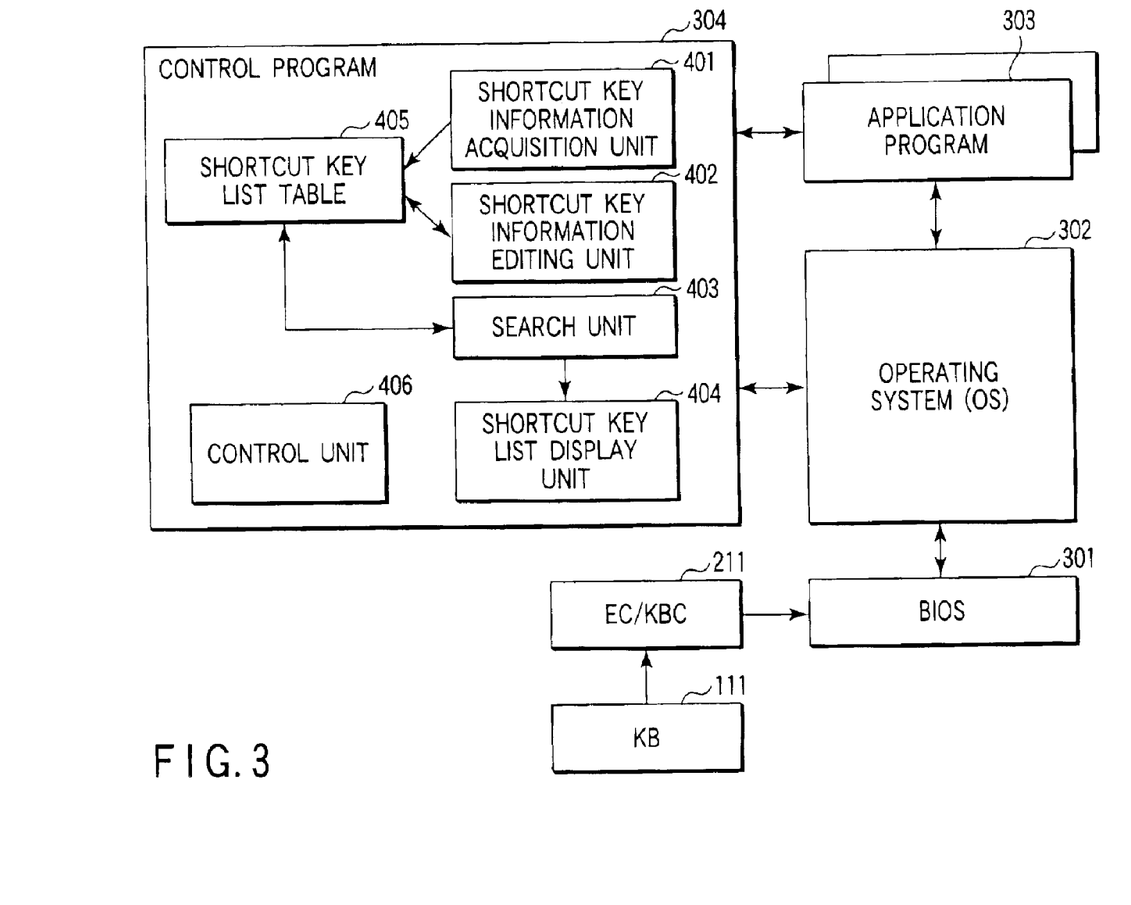
FIG. 3 is a block diagram showing a configuration for displaying a shortcut key list in the computer of the embodiment.

Referring now to FIG. 3, a configuration for displaying the shortcut key list window 300 will be described.

If a key on the keyboard (KB) 11 is depressed by the user, a key code associated with the key is sent to the operating system (OS) 302 via the embedded controller/keyboard controller IC (EC/KBC) 211 and BIOS 301. The operating system (OS) 302 informs a currently active application program 303 of the received key code, and also informs a control program 304 of the key code.

The active application program, in this context, means an application with a currently focused window of a plurality of currently running application programs, that is, an application program with a window associated with cursor movement, command input and text input.

The key code sent to the control program 304 from the operating system (OS) 302 is a key code assigned to an auxiliary key that is a part of a shortcut key.

The shortcut key, in this context, means a combination of keys used to enable the active application program 303 to perform a specified function. Each shortcut key comprises an auxiliary key and another key, other than the auxiliary key, such as an alphabet key. The auxiliary key comprises a single key selected from, e.g. [Ctrl], [Alt], [Shift] and [Tab] keys, or a combination of two or more of the [Ctrl], [Alt], [Shift] and [Tab] keys.

For example, when the [Ctrl] key, [Alt] key, [Shift] key, [Tab] key, a combination of [Ctrl] key and [Alt] key ([Ctrl]+[Alt] key), or a combination of [Ctrl] key and [Shift] key ([Ctrl]+[Shift] key) is depressed, the operating system (OS) 302 determines that the auxiliary key has been depressed and informs the control program 304 of a key code (make code) relating to the key or key combination corresponding to the depressed auxiliary key. Further, when the depressed auxiliary key is released, the operating system (OS) 302 informs the control program 304 of a key code (break code) relating to the key or key combination corresponding to the auxiliary key.

The control program 304 is a dedicated utility program designed to display the shortcut key list window 300, and it is realized as a TSR (Terminate-and-Stay-Resident) program.

The control program 304 starts a display process for displaying the shortcut key list window 300, recognizing, as a trigger, a continuous depression of the auxiliary key by the user for a predetermined time period (e.g. 5 seconds). The shortcut key list window 300 displays a list of shortcut keys using the depressed auxiliary key, which are chosen from a plurality of usable shortcut keys of the computer.

The control program 304, as shown in FIG. 3, comprises a shortcut key information acquisition unit 401, a shortcut key information editing unit 402, a search unit 403, a shortcut key list display unit 404, a shortcut key list table 405, and a control unit 406.

The shortcut key information acquisition unit 401 acquires, from the operating system (OS) 302 and active application program 303, a list of shortcut keys that are executable by these programs. Normally, each of application programs includes, as an accelerator, shortcut key information indicative of a list of shortcut keys executable by the application program. The accelerator is information that is used by the operating system (OS) 302 to recognize what kinds of shortcut keys each application program can use. The operating system (OS) 302 also includes shortcut key information indicative of a list of shortcut keys, which the OS 302 can process.

The shortcut key information acquisition unit 401 acquires, from the operating system (OS) 302 and active application program 303, the shortcut key information embedded therein, and registers the acquired information in the shortcut key list table 405.

The shortcut key information registered in the shortcut key list table 405 includes, in association with each shortcut key, information indicative of a combination of keys that constitute the shortcut key, and explanatory information of the function associated with the shortcut key. In some cases, the shortcut key information acquired from the operating system (OS) 302 or active application program 303 may include only the information on the key combination corresponding to each shortcut key, without containing information (text) explanatory of the function of the shortcut key. In such cases, the shortcut key information acquisition unit 401 can acquire explanatory information of the function of each shortcut key, from a help file of each of the operating system (OS) 302 and active application program 303.

The shortcut key information editing unit 402 edits the shortcut key information registered in the shortcut key list table 405, in accordance with the user's key operations. By making use of the shortcut key information editing unit 402, the user can, as desired, add shortcut key information (key combinations and text information) to the shortcut key list table 405, and add text information of the function associated with the shortcut key, with respect to which only the key combination is registered in the shortcut key list table 405.

The search unit 403 retrieves a shortcut key including the depressed auxiliary key, from the shortcut key information registered in the shortcut key list table 405. The shortcut key list display unit 404 causes either the display unit 12 (main display) or the sub-display of the pointing device 112 to display, on its display screen, the shortcut key list window 300 that displays a list of shortcut keys including the depressed auxiliary key.

The control unit 406 executes, for example, a process for displaying a menu screen indicating a list of functions provided by the control program 304, and a configuration set-up process relating to each function of the control program 304, which is selected on the menu screen.

A procedure of the shortcut key list displaying process executed by the control program 304 will now be described with reference to a flow chart of FIG. 4.

The control program 304 detects whether an auxiliary key has been depressed by the user (step S101, S102). That is, the control program 304 first determines whether an auxiliary key has been depressed on the basis of notification on a key code associated with an auxiliary key (hereinafter referred to as "auxiliary key-associated key code") from the operating system (OS) 302 (step S101). If the operating system (OS) 302 has notified the control program 304 of the auxiliary key-associated key code, that is, if the depression of the auxiliary key has been detected (YES in step S101), the control program 304 then determines whether the depression of the auxiliary key is continued for five seconds or more (step S102). In this case, the control program 304 counts an elapsed time from the notification of the auxiliary key-associated key code (make code) from the operating system (OS) 302. The control program 304 detects continuous depression of the auxiliary key for five or more seconds, on condition that the operating system (OS) 302 does not send to the control program 304 a break code corresponding to the auxiliary key before the elapsed time exceeds five seconds.

If continuous depression of the auxiliary key for five or more seconds is detected (YES in step S102), the control program 304 executes the following process in order to display the shortcut key list window 300.

To start with, the control program 304 determines shortcut key information common to the system is already registered in the shortcut key list table 405 (step S103). The shortcut key information common to the system, in this context, means a shortcut key group available in the operational environment of the operating system (OS) 302. This shortcut key group corresponds to a shortcut key group necessary for executing functions defined in the operating system (OS) 302. Shortcut keys relating to functions realized by the operating system (OS) 302, such as copy, cut, paste, file save and print out, are shortcut keys common to the system.

If the shortcut key information common to the system is not registered in the shortcut key list table 405 (NO in step S103), the control program 304 acquires the shortcut key information common to the system from the operating system (OS) 302, using the shortcut key information acquisition unit 401. The acquired common shortcut key information is stored in the shortcut key list table 405 (step S104). On the other hand, if the shortcut key information common to the system is already registered in the shortcut key list table 405 (YES in step S103), the process in step S104 is skipped and not executed.

Next, the control program 304 inquires of the operating system (OS) 302 about the name of the currently active application program, thereby to detect the name of the active application program (step S105). The control program 304 determines whether shortcut key information corresponding to the detected active application program is already registered in the shortcut key list table 405 (step S106).

If the shortcut key information corresponding to the currently active application program is not registered in the shortcut key list table 405 (NO in step S106), the control program 304 acquired shortcut key information relating exclusively to the currently active application program from the active application program, using the shortcut key information acquisition unit 401, and stores the acquired shortcut key information in the shortcut key list table 405 (step S107). On the other hand, if the shortcut key information corresponding to the currently active application program is registered in the shortcut key list table 405 (YES in step S106), the process in step S107 is skipped and not executed.

Based on the shortcut key information registered in the shortcut key list table 405, the control program 304 causes the display screen to display the shortcut key list window 300 that shows a list of shortcut keys using the depressed auxiliary key (step S108).

Figure 5:
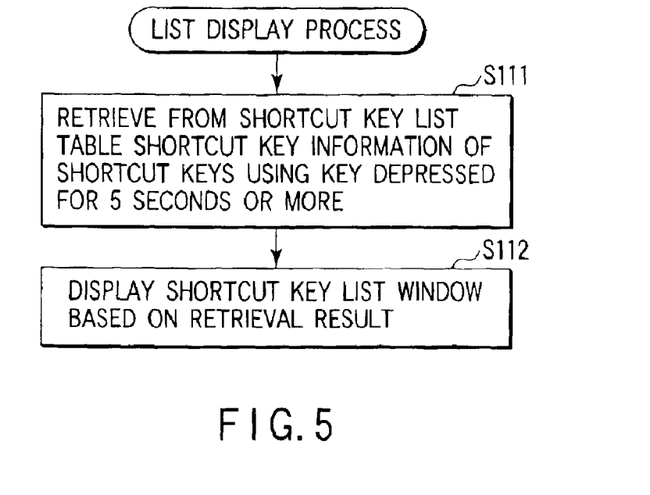
FIG. 5 is a flow chart illustrating a procedure of a shortcut key list window displaying process that is executed in the shortcut key list displaying process illustrated in FIG. 4.

FIG. 5 is a flow chart illustrating a specific processing procedure of the shortcut window display process executed in step S108.

Specifically, using the search section 403, the control program 304 retrieves shortcut keys using the depressed auxiliary key from the shortcut key list table 405 (step S111). That is, the control program 304 retrieves shortcut keys using the depressed auxiliary key from the shortcut key information common to the system and the shortcut key information corresponding to the currently active application program, which is registered in the shortcut key list table 405. Then, using the shortcut key list display unit 404, the control program 304 generates the shortcut key list window 300 showing the list of shortcut keys using the depressed auxiliary key, on the basis of the retrieval result obtained in step S111, and the control program 304 causes the display screen to present the generated shortcut key list window 300 (step S112).

Figure 6:
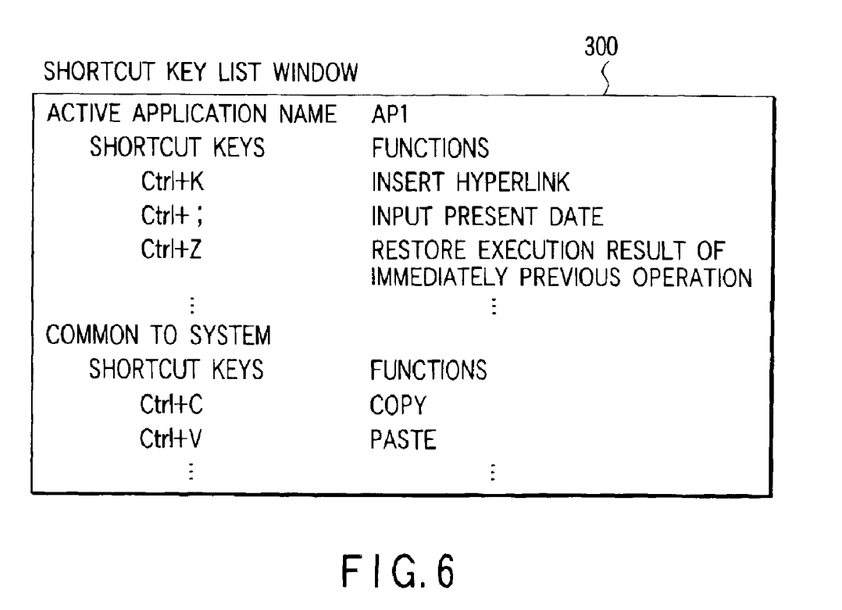
FIG. 6 shows an example of a shortcut key list window displayed on a display screen of the computer of the embodiment.

FIG. 6 shows an example of the shortcut key list window 300. This shortcut key list window 300 is displayed when the depressed auxiliary key is [Ctrl] key.

To be more specific, when the depressed auxiliary key is [Ctrl] key, the shortcut key list window 300 displays the following shortcut key information:

(1) Name of the currently active application program (AP1 in this example), (2) List of shortcut keys (a key combination of each shortcut key and explanatory text of its function) including the [Ctrl] key as an auxiliary key, which are retrieved from a shortcut key group associated with executable functions of the application program AP1, and (3) List of shortcut keys (a key combination of each shortcut key and explanatory text of its function) including the [Ctrl] key as an auxiliary key, which are retrieved from a shortcut key group common to the system.

As described above, the shortcut key list window 300 separately displays the shortcut key information relating exclusively to the currently active application program and the shortcut key information common to the system. Further, the shortcut keys displayed are limited to those including the auxiliary key depressed by the user. Simply by depressing the auxiliary key of the shortcut key corresponding to the desired function, the user can confirm a list of shortcut keys including the shortcut key corresponding to the desired function.

If the user depresses the other associated key, e.g. [k] key, of the key combination of the desired shortcut key, while keeping depressing the auxiliary key ([Ctrl] key in this example), the operating system (OS) 302 informs the presently active application program of a key code corresponding to the shortcut key ([Ctrl]+[k]) comprising the [Ctrl] key and [k] key. Thus, the active application program executes the function associated with the shortcut key ([Ctrl]+[k]), e.g. "hyperlink insertion" function.

The shortcut key list window 300 is kept displayed while the user is depressing the auxiliary key ([Ctrl] key in this example). Thus, by keeping depressing the [Ctrl] key, the user can input various shortcut keys while viewing the shortcut key list window 300.

Figure 7:
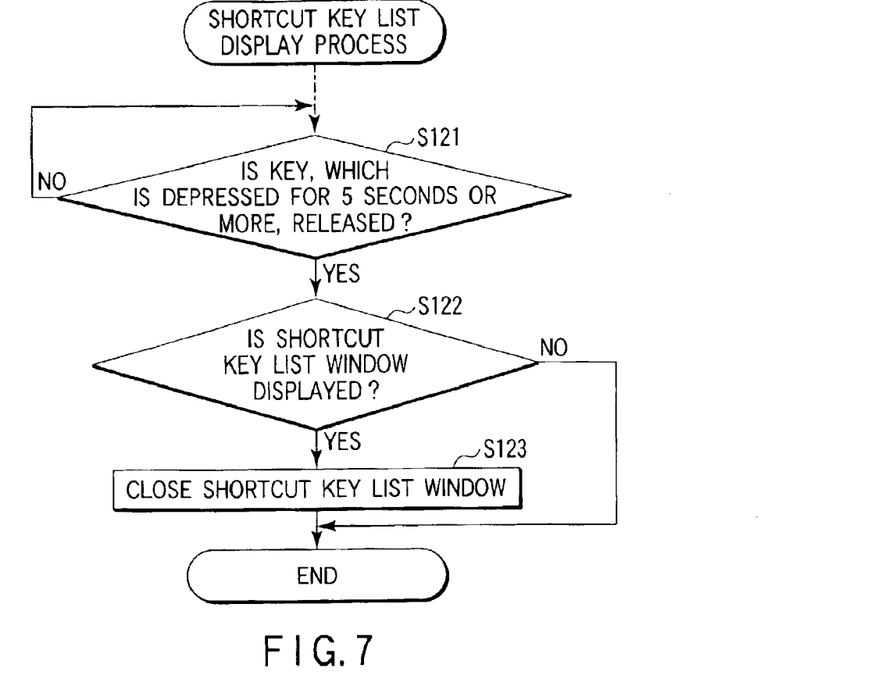
FIG. 7 is a flow chart illustrating a process procedure that is executed when an auxiliary key is released in the computer of the embodiment.

Referring now to a flow chart of FIG. 7, a description will be given of a process executed by the control program 304 when the auxiliary key, which is continuously depressed for five seconds or more, is released.

When the operating system (OS) 302 has notified the control program 304 of a break code of the auxiliary key that has continuously been depressed for five seconds or more, the control program 304 detects the release of the auxiliary key (YES in step S121). Upon detecting the release of the auxiliary key, the control program 304 determines whether the shortcut key list window 300 is being displayed (step S122).

If the shortcut key list window 300 is being displayed (YES in step S122), the control program 304 stops display of the shortcut key list window 300 and closes the shortcut key list window 300 (step S123).

In this manner, the displaying of the shortcut key list window 300 is stopped upon the release of the auxiliary key.

Thereby, it becomes possible to display the shortcut key list window 300 only while the auxiliary key is being depressed. Hence, the display/non-display of the shortcut key list window 300 can automatically be controlled in accordance with the operation of the auxiliary key by the user.

Figure 8:
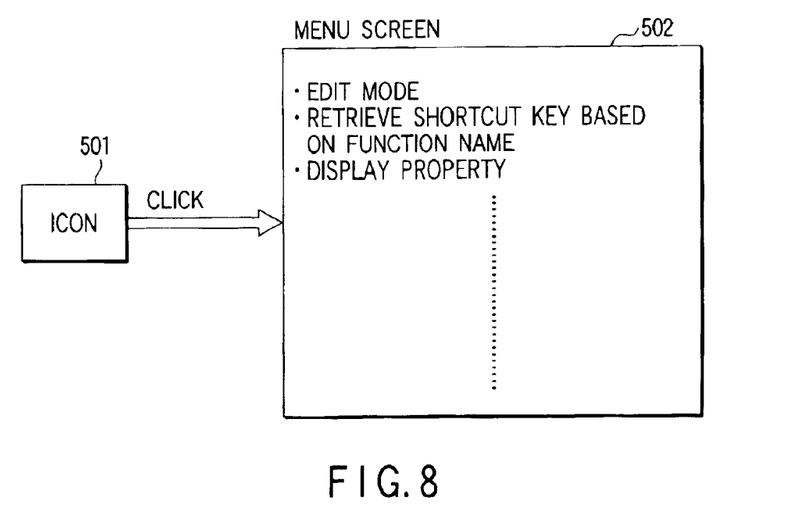
FIG. 8 is a view for explaining functions of a control program used in the computer of the embodiment.

The other functions of the control program 304 relating to the shortcut key display will now be described with reference to FIG. 8.

The control program 304, as mentioned above, is realized by a terminate-and-stay-resident (TSR) program. An icon 501 of the control program 304 is always displayed on the task tray on the desktop screen displayed on the main display. If the icon 501 is clicked, the menu screen 502 is displayed. The menu screen 502 displays, as selectable functional items, "EDIT MODE", "RETRIEVE SHORTCUT KEY BASED ON FUNCTION NAME", "DISPLAY PROPERTY", etc. The user can select a desired function on the menu screen 502.

(1) "Edit Mode"

The edit mode enables the user to edit, by key operations, the shortcut key information registered in the shortcut key list table 405. The edit mode is used to supplement the content of the shortcut key information acquired from the OS or application program.

The shortcut key information obtainable from the OS or application may be limited to the information indicative of a key combination of each shortcut key, and the function names of the shortcut keys may not be available. By using the edit mode, it becomes possible to additionally register the function names, etc. in the shortcut key list table 405.

Figure 9:
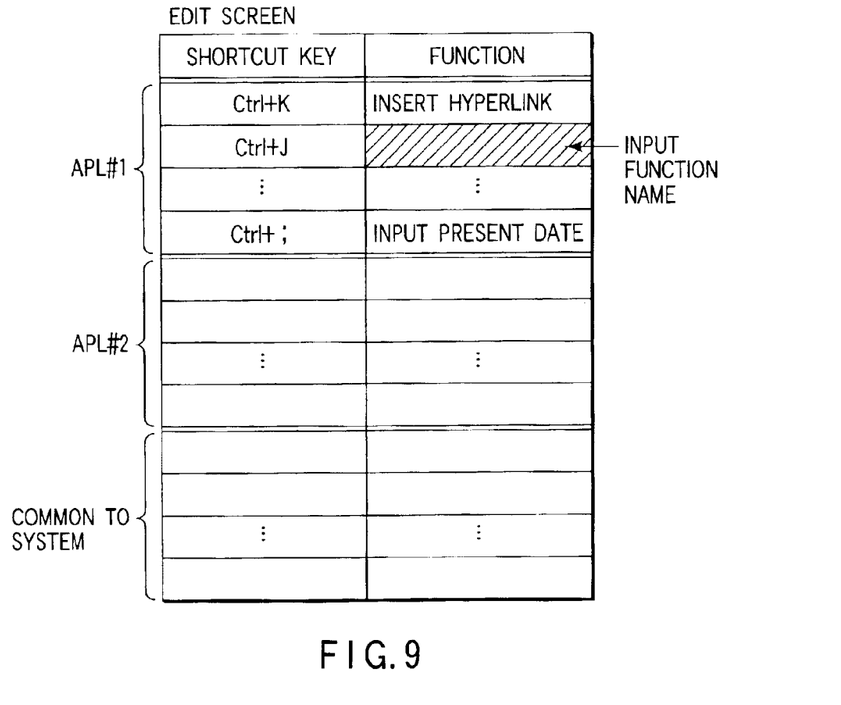
FIG. 9 shows an example of an editing screen displayed on the computer of the embodiment.

If the user selects the edit mode, the shortcut key information editing unit 402 causes an edit screen to be displayed, as shown in FIG. 9. The edit screen displays the shortcut key information relating exclusively to each application and the shortcut key information common to the system, which is all registered in the shortcut key list table 405. Assume, for example, that the shortcut key list table 405 stores no information relating to the function of the shortcut key ([Ctrl]+[J]) of the application program (APL#1). In this case, the user inputs, through key operations, text indicative of the function name (functional explanation) associated with the shortcut key ([Ctrl]+[J]). Thus, information of the function name of the shortcut key ([Ctrl]+[J]) can be registered in the shortcut key list table 405.

(2) "Display Property"

The "display property" is a function of designating display/non-display of each shortcut key registered in the shortcut key list table 405. This function is used to exclude shortcut keys, which are already memorized by the user, from the objects of display.

Figure 10:
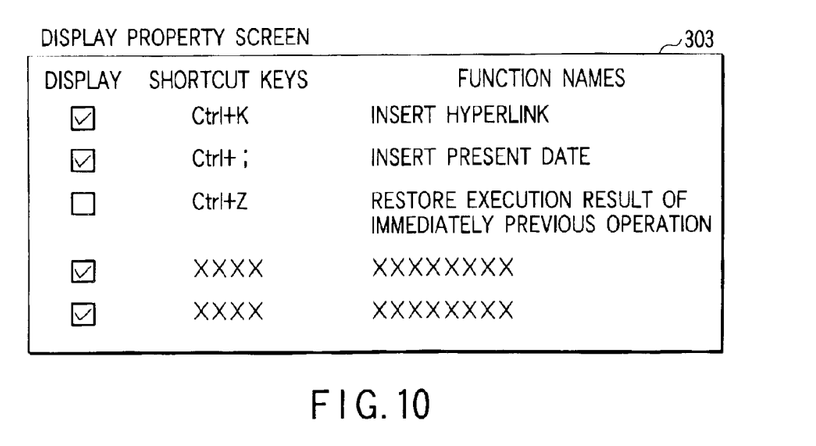
FIG. 10 shows an example of a display property screen displayed on the computer of the embodiment.

If the "display property" is selected by the user, a display property screen is displayed, as shown in FIG. 10. The display property screen, as shown in FIG. 10, includes check boxes for designating display/non-display of shortcut keys registered in the shortcut key list table 405. The user deletes check marks in connection with shortcut keys with which he/she is already familiar. Thereby, the user can exclude such shortcut keys from the objects of display. It is thus possible for the user to display on the shortcut key list window 300 only a list of shortcut keys with which he/she is not familiar.

Figure 4:
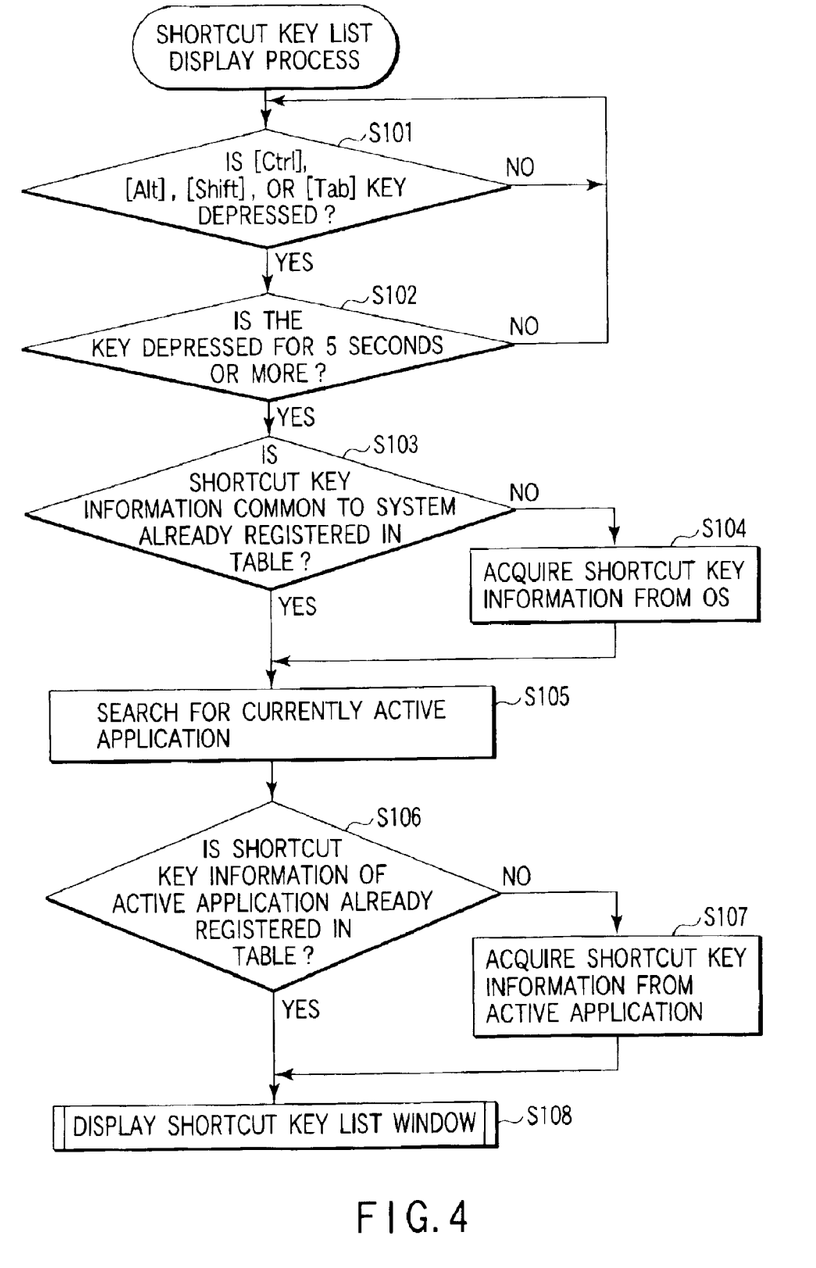
FIG. 4 is a flow chart illustrating a procedure of a shortcut key list displaying process in the computer of the embodiment.
Figure 11:
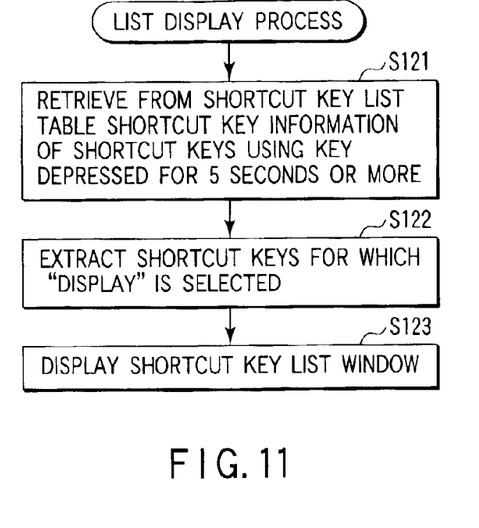
FIG. 11 is a flow chart illustrating a procedure of a shortcut key list window displaying process executed based on information set on the display property screen shown in FIG. 10.

FIG. 11 is a flow chart illustrating a specific processing procedure of the shortcut list window display process based on the content of setting of "display property." This process is executed in step S108 in FIG. 4.

The control program 304 retrieves shortcut keys using the depressed auxiliary key from the shortcut key list table 405

(step S121). In this example, a search for shortcut key information using the depressed auxiliary key is conducted through the shortcut key information common to the system and the shortcut key information associated with the currently active application program, which is all registered in the shortcut key list table 405. Then, the control program 304 extracts, from the retrieved shortcut key information, shortcut keys (shortcut keys with check marks in their check boxes) for which "DISPLAY" is selected in the "display property" function (step S122). Based on the extracted result in step S122, the control program 304 generates the shortcut key list window 300 showing a list of shortcut keys using the depressed auxiliary key, and displays the shortcut key list window 300 on the display screen (step S123).

(3) "Retrieve Shortcut Key Based on Function Name"

This function relates to a so-called "reverse lookup", whereby a combination of keys of the shortcut key is retrieved based on the function names of shortcut keys registered in the shortcut key list table 405.

Figure 12:
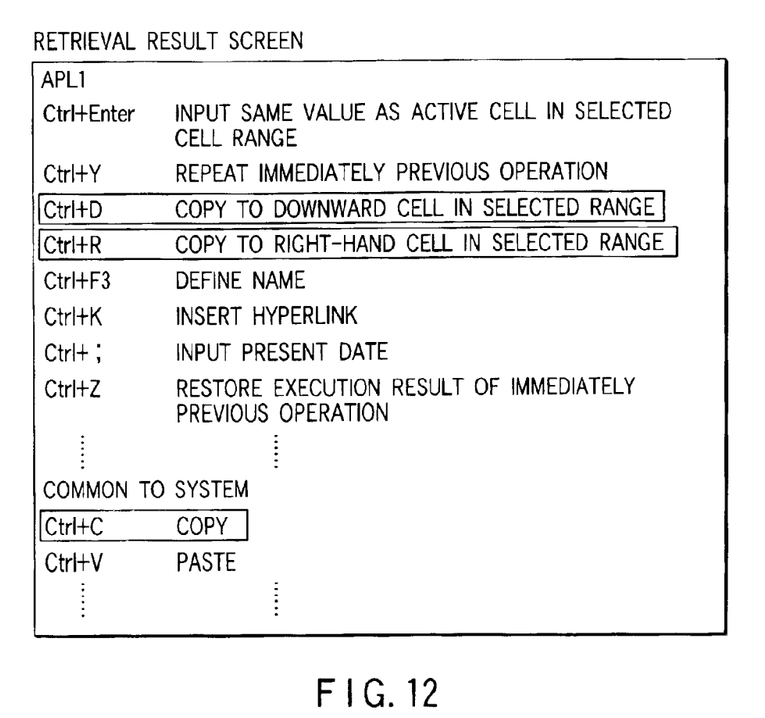
FIG. 12 shows an example of a retrieval result screen displayed on the computer of the embodiment.

If the user selects "RETRIEVE SHORTCUT KEY BASED ON FUNCTION NAME", a text input field is displayed on the display screen. The user inputs a function name in the text input field, and a search for the shortcut key corresponding to the input function name is carried out through the shortcut key list table 405. Thus, a retrieval result screen, as shown in FIG. 12, is displayed. The retrieval result screen in FIG. 12 displays a retrieval result obtained when "COPY" has been input as the function name in the text input field. That is, the retrieval result screen displays a list of shortcut keys including the word "COPY" as a function name, which have been retrieved from the shortcut key information registered in the shortcut key list table 405. To be more specific, the retrieval result screen displays the shortcut key information available in the currently active application and the shortcut key information common to the system, and the information of shortcut keys including the word "COPY" as the function name is emphasized. Of course, only a list of shortcut keys including the word "COPY" as the function name may be displayed on the retrieval result screen.

Figure 13:
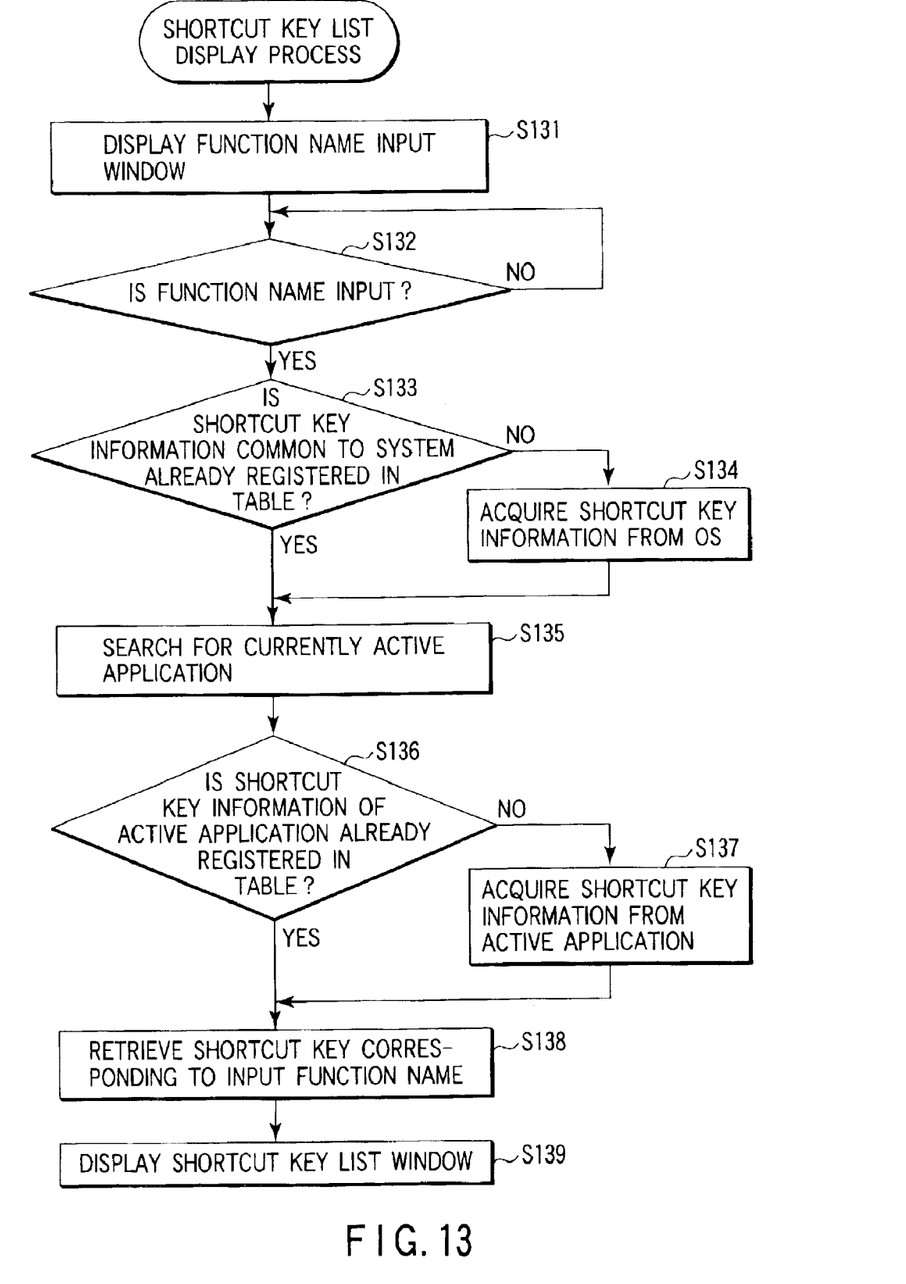
FIG. 13 is a flow chart illustrating a procedure of a retrieval process executed in the computer of the embodiment.

FIG. 13 is a flow chart illustrating the processing procedure executed when the "RETRIEVE SHORTCUT KEY BASED ON FUNCTION NAME" is selected.

If "RETRIEVE SHORTCUT KEY BASED ON FUNCTION NAME" is selected on the menu screen, the control program 304 first causes the display screen of the main display to display the text input field (function name input window) (step S131). If the function name is input to the text input field (YES in step S132), the control program 304 executes the following process in order to display the retrieval result screen.

The control program 304 first determines whether the shortcut key information common to the system is already registered in the shortcut key list table 405 (step S133). If the shortcut key information common to the system is not registered in the shortcut key list table 405 (NO in step S133), the control program 304 acquires the shortcut key information common to the system from the operating system (OS) 302, and stores the acquired information in the shortcut key list table 405 (step S134). If the shortcut key information common to the system is already registered in the shortcut key list table 405 (YES in step S133), the process in step S134 is skipped and not executed.

Subsequently, the control program 304 inquires of the operating system (OS) 302 about the name of the currently active application program, thereby to detect the name of the active application program (step S135). The control program 304 determines whether the shortcut key information corresponding to the detected active application program is already registered in the shortcut key list table 405 (step S136).

If the shortcut key information corresponding to the currently active application program is not registered in the shortcut key list table 405 (NO in step S136), the control program 304 acquired shortcut key information relating exclusively to the currently active application program from the active application program, and stores the acquired shortcut key information in the shortcut key list table 405 (step S137). On the other hand, if the shortcut key information corresponding to the currently active application program is already registered in the shortcut key list table 405 (YES in step S136), the process in step S137 is skipped and not executed.

The control program 304 retrieves a list of shortcut key information corresponding to the input function name from the shortcut key information registered in the shortcut key list table 405 (step S138), and causes the display screen of the main display or the sub-display to display the retrieval result screen as the shortcut key list window (step S139).

As has been described above, according to the present embodiment, if the user depresses a certain auxiliary key, the depression triggers the process for displaying, on the display screen, a list of shortcut keys including the detected depressed auxiliary key, which have been retrieved from among the shortcut keys usable in the computer. Thereby, without the need to memorize key combinations of all shortcut keys, the user can confirm on the display screen the list of shortcut keys using an auxiliary key by simply inputting the auxiliary key. Further, by displaying a list of shortcut keys that are executable by the currently active application program, the user can be given proper guidance on the presently usable shortcut keys.

The control program 304 may be stored in a computer-readable storage medium. In this case, the same advantages as with the present embodiment can easily be obtained merely by loading the control program 304 in an ordinary computer via the storage medium and executing the control program 304.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus for executing functions associated with a plurality of shortcut keys each comprising a combination of at least one auxiliary key and another key, the apparatus comprising:

a key-input device including a plurality of keys;

means for detecting depression of the auxiliary key of the key-input device;

means for storing shortcut key information indicative of a plurality of shortcut keys usable in the information processing apparatus;

means for retrieving, from the shortcut key information, shortcut keys including the detected auxiliary key;

means for displaying, on a display screen, a list of shortcut keys which are retrieved from the shortcut key information; and means for designating ones of the shortcut keys, which are included in the plurality of shortcut keys indicated by the shortcut key information, but are to be excluded from objects of display.

2. The information processing apparatus according to claim 1, wherein the means for detecting depression of the auxiliary key includes means for detecting depression of the auxiliary key when the auxiliary key is depressed for a predetermined time period.

3. The information processing apparatus according to claim 1, wherein the means for displaying the list of the shortcut keys includes means for stopping display of the list of the shortcut keys in response to release of the depressed auxiliary key such that the list of the shortcut keys is displayed during the depression of the auxiliary key.

4. The information processing apparatus according to claim 1, wherein the means for displaying the list of the shortcut keys includes means for displaying on the display screen a combination of keys, which constitute each of the shortcut keys including the detected auxiliary key, and an explanation of a function associated with said each of the shortcut keys.

5. The information processing apparatus according to claim 1, further comprising means for detecting an active application program that is currently running in the information processing apparatus, wherein the means for displaying the list of the shortcut keys includes means for displaying on the display screen a list of shortcut keys, which correspond to the detected active application program and include the detected auxiliary key.

6. The information processing apparatus according to claim 1, further comprising:

means for detecting an active application program in the information processing apparatus, wherein the means for displaying the list of the shortcut keys includes means for retrieving, from the shortcut key information, shortcut keys which correspond to the detected active application program and include the detected auxiliary key.

7. The information processing apparatus according to claim 6, further comprising means for acquiring, when the shortcut key information corresponding to the detected active application program is not stored, shortcut key information indicative of shortcut keys executable by the application program from the detected active application program.

8. An information processing apparatus for executing functions associated with a plurality of shortcut keys comprising a combination of at least one auxiliary key and another key, the apparatus comprising:

a main body;

a display rotatably provided on the main body;

a sub-display provided on the main body;

a key-input device including a plurality of keys;

means for detecting depression of the auxiliary key of the key-input device; and means for displaying, on the sub-display, a list of the shortcut keys including the detected auxiliary key.

9. The information processing apparatus according to claim 8, further comprising:

means for detecting an active application program that is currently running in the information processing apparatus, wherein the means for displaying the list of the shortcut keys includes means for displaying on the sub-display a list of the shortcut keys which correspond to the detected active application program and include the detected auxiliary key.

10. The information processing apparatus according to claim 9, further comprising:

means for acquiring, when the shortcut key information corresponding to the detected active application program is not stored in the storing means, the shortcut key information indicative of shortcut keys executable by the application program from the detected active application program.

11. The information processing apparatus according to claim 8, further comprising:

storing means for storing shortcut key information indicative of the plurality of the shortcut keys usable in the information processing apparatus; and means for detecting an active application program in the information processing apparatus, wherein the means for displaying the list of the shortcut keys includes means for retrieving, from the shortcut key information, shortcut keys which correspond to the detected active application program and include the detected auxiliary key.

* * * * *